US006188328B1

(12) United States Patent
Ho

(10) Patent No.: US 6,188,328 B1
(45) Date of Patent: Feb. 13, 2001

(54) VEHICLE PARKING DEVICE

(76) Inventor: George Ho, Suite1311, Prince's Building, Central (HK)

( * ) Notice: Under 35 U.S.C. 154(b), the term of this patent shall be extended for 0 days.

(21) Appl. No.: 09/377,500

(22) Filed: Aug. 20, 1999

(51) Int. Cl.[7] ........ B60Q 1/48

(52) U.S. Cl. ........ 340/932.2; 340/309.15; 340/905; 368/90

(58) Field of Search ........ 340/932.2, 905, 340/936; 368/90; 701/1; 455/456; 194/900, 902; 235/377

(56) References Cited

U.S. PATENT DOCUMENTS

| | | | | |
|---|---|---|---|---|
| 4,730,285 | * | 3/1988 | Lie | 368/90 |
| 4,876,540 | * | 10/1989 | Berthon et al. | 340/932.2 |
| 4,879,553 | * | 11/1989 | Righi | 340/932.2 |
| 5,003,520 | * | 3/1991 | Grieu et al. | 368/90 |
| 5,166,680 | * | 11/1992 | Ganot | 340/932.2 |
| 5,266,947 | * | 11/1993 | Fujiwara et al. | 340/932.2 |
| 5,339,000 | * | 8/1994 | Bashan et al. | 340/932.2 |
| 5,382,780 | * | 1/1995 | Carmen | 235/384 |
| 5,737,710 | * | 4/1998 | Anthonyson | 701/1 |
| 5,748,107 | * | 5/1998 | Kersken et al. | 340/905 |
| 5,918,180 | * | 6/1999 | Dimino | 455/456 |
| 5,977,884 | * | 11/1999 | Ross | 340/936 |

* cited by examiner

*Primary Examiner*—Jeffery A. Hofsass
*Assistant Examiner*—Phung Nguyen
(74) *Attorney, Agent, or Firm*—Pollock, Vande Sande & Amernick, RLLP

(57) ABSTRACT

A parking meter device that is devoted to a separate person or vehicle comprises a housing unit 10 that has an LED 11 that in use is clearly visible from outside the vehicle. The device includes a two-way radio circuit 12, a display 14 and a keyboard 15. The unit also includes a computer 19. In use, the user communicates, using the keyboard 15, with a remote central parking service provide via radio data network channels to demand a parking period. The parking service provider checks the authenticity of the demand and approves the parking request. During lawful, paid for, parking the LED 11 remains ON so that a patrolling parking attendant can easily monitor that parking approval has been given. The parking meter device is in effect a personal device and overcomes disadvantages and limitations inherent for usual side-of-the-road parking meter devices that are devoted to parking bays or zones rather than individuals.

12 Claims, 1 Drawing Sheet

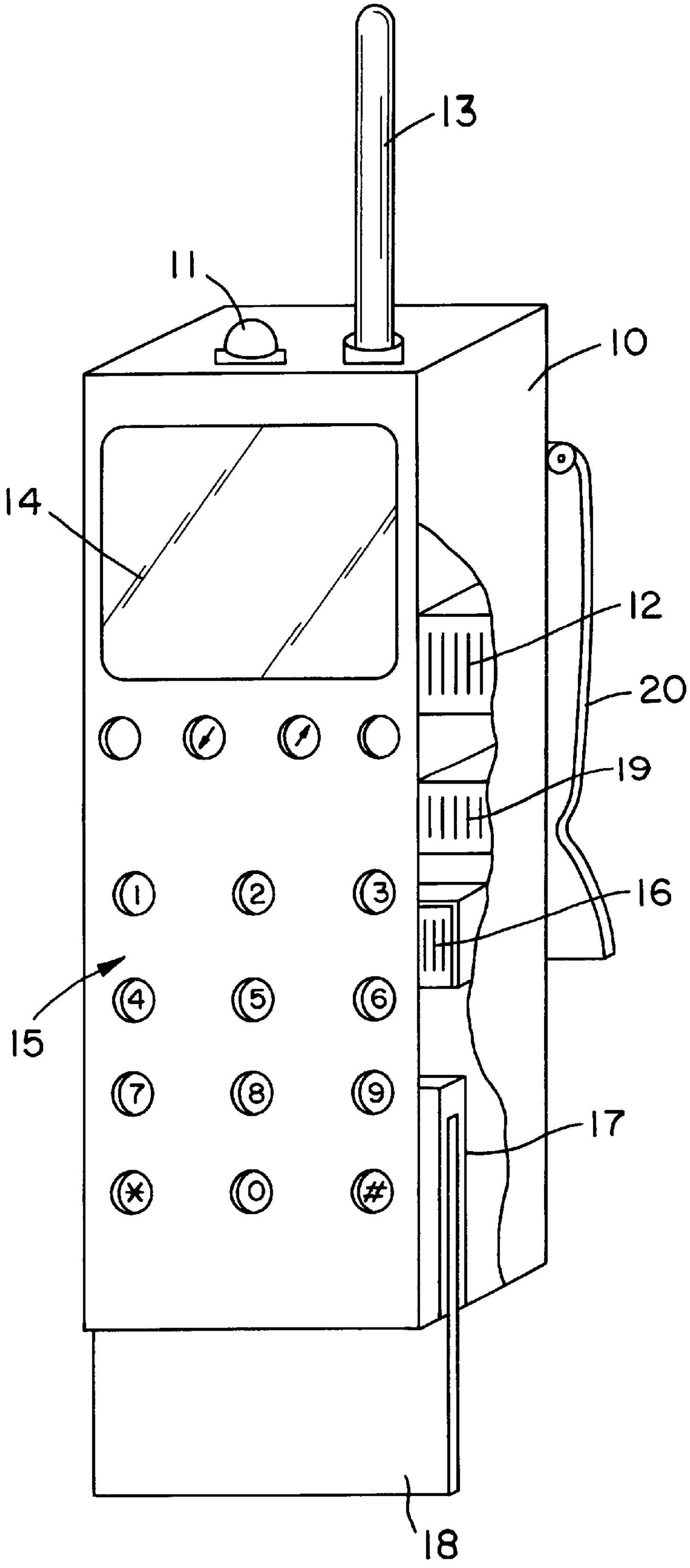
13
11
10
14
12
20
19
16
15
17
18

VEHICLE PARKING DEVICE

BACKGROUND OF THE INVENTION

1. Field of the Invention

The invention relates to vehicle parking devices.

2. Description of Prior Art

At present for vehicle parking arrangements a stationary parking meter is provided for each parking bay, or zone, that must be charged with cash either before parking or at the end of a period of parking. The parking meters may in some instances be operated using a credit card or devoted pre-paid card. In all cases, each meter is committed to its own parking bay or zone, and being generally accessible, remains vulnerable to vandalism and robbery. Further inherent problems arise in adjusting or varying the parking tariff at each meter from time to time, as each meter must then be visited and adjusted. Maintenance crews and breakdown crews are also required to service and repair the parking meters as an on-going expense.

SUMMARY OF THE INVENTION

It is an object of the invention to overcome or at least reduce these problems.

According to the invention there is provided a parking meter device for separate devoted use by a vehicle user arranged to be located in the vehicle and visible from outside the vehicle during use, the device comprising a portable housing unit arranged to be supported inside the vehicle and including a visual indicator for portraying a positive condition of the device during use, a two-way radio circuit for communicating with a parking service provider, a screen and manually responsive switch means, including a computer programmed to enable the user by using the switch means to alert the service provider of his desire to park in a parking bay and for the service provider to approve vehicle parking for a time period, in which the approval is confirmed during that time period by maintaining the device in the positive condition.

The manually responsive switch means is preferably a keypad.

The unit is preferably releasably attachable in the vehicle.

The unit may include a timer arranged to change the device from the positive condition after a predetermined time interval.

The visual indicator may be arranged to portray another condition of the unit after the termination of the predetermined time interval.

The unit is preferably arranged to incorporate a Subscriber Identity Module (SIM card).

The unit may have a port arranged to receive and hold a pre-paid tariff parking card.

The device may be arranged to respond to signals from a vehicle security alarm system and to transmit a warning signal when initiated by the vehicle security alarm system.

The warning signal is preferably a radio signal and transmitted to a telephone network.

The device may be arranged to communicate with a Global Positioning System (GPS).

The device may be arranged to receive information from the parking service provider identifying on the screen any unoccupied parking bays in locations adjacent to the vehicle.

BRIEF DESCRIPTION OF THE DRAWINGS

A portable personal parking meter device according to the invention will now be described by way of example with reference to the accompanying drawing which shows a partly cut-away isometric view of a housing unit of the device.

DESCRIPTION OF THE PREFERRED EMBODIMENTS

Referring to the drawing, the device comprises a housing unit 10 that is releasably attachable adjacent a windscreen of a vehicle. An LED 11 is mounted in a top of the unit 10 for visually indicating the condition of the device in a manner that is clearly visible from outside the vehicle. A two-way radio circuit 12 is supported inside the unit 10 and an aerial 13 mounted on top of the unit.

A liquid crystal display 14 and a keyboard 15 are mounted at the front of the unit 10, and a Subscriber Identity Module (SIM card) 16 releasably mounted inside the unit 10. A port 17 in a base of the unit is provided to slidably receive and hold a pre-paid tariff parking card 18. The unit 10 also houses a computer 19 that is programmed to carry out various functions as discussed below. A spring clip 20 mounted to a back of the unit 10 is used to hold the unit against a vehicle dashboard.

Generally stated, the described parking meter device departs in principle from the prior art by being related and separately devoted to a vehicle user (or vehicle); at present parking meters are devoted to parking bays or zones. The described meter device is used in practice in conjunction with a remote parking service provider who monitors, controls, calculates and collects payment centrally, using radio communications. The radio communications pass between a central parking service provider and any number of parking meter devices owned by or in the possession of various vehicle users. It will therefore be appreciated, as a direct consequence, that it is relatively easy to centrally adjust, according to time-of-day, changes in tariffs according to type of user or overall, the payments required and determine lawfully allowed time periods. The technology to be used and the computer programming required is well-practised already for such adjustments and also available for use more generally in other applications. The technology and computer programming are especially well-known in mobile telephone applications, for example. Thus, the unit 10 may take the form of a suitably modified mobile telephone module that, in this case, is arranged to use communications with the parking service provider in a manner that in itself is well-understood by those skilled in the art. Various optional or additional features mentioned below are also within the normal technical capability of such forms of communications. Normal, or so-called "normal", arrangements of the use of SIM cards, insertable pre-paid tariff cards (that may be re-charged when required with further credit, using the communications), security checking and so forth are all well-understood in such other applications already. It is also known to apply Global Positioning System (GPS) information to vehicle mounted devices that operate as navigational aids or vehicle locating (or monitoring) devices in the event that the vehicle is driven away without proper authority for example. In short, the specifically described device in its simplest form uses well-known technology and enables vehicle parking to be carried out, supervised and paid for, in a much improved fashion as compared to present practice. In more sophisticated embodiments of the invention, the device can be significantly enhanced, when desired, by one or more of numerous additional features that each never-the-less rely on the proven and available technology without altering to any great extent the usefulness and general portability of the device in its primary role use for vehicle parking.

Returning to the drawing, the device is used when parking a vehicle by the user selecting a suitable parking bay and using the keyboard 15 to communicate with the parking service provider. Normally, the user identifies himself (or is identified by the signals that his device transmits) and the parking bay or zone, and requests a parking period required. The communications between the user's device and the parking service provider will normally make use of local radio network data channels. The parking service provider checks the identity and payment arrangements (the user may have a pre-paid card 18 or have a current credit and billing arrangement) and whether the parking period is available and/or allowed. (In public parking places, the parking may be restricted according to time of day and a maximum parking period may be determined by local bye-laws, for example) A parking approval is communicated to the user's device and is displayed on the screen 14, and the LED 11 is turned ON. This has been referred to elsewhere as portraying a "positive condition of the device".

The keypad 15 may be simplified and comprise a single manually operable button or may be replaced by a simple touch pad. In such an arrangement, the button or pad is used when required to turn ON the device. In other words, it is necessary only to turn ON the device on arrival at a parking bay and the request and appropriate approval can then be communicated to and from the parking service provider. The single button or the pad thus provides the "manually responsive switch means". Such manually responsive switching means could also comprise, in effect, the plugging in of the device to a power supply socket, such as a cigarette lighter socket in the vehicle for example.

When the device is in use and mounted in the vehicle, the LED 11 is positioned so as to be clearly visible from outside the vehicle to enable a patrolling parking attendant to check the condition of the device from time to time to ensure that the vehicle is legitimately parked and that the relevant parking tariff has been paid. At the end of the approved parking period the LED 11 is turned OFF. Normally this is controlled by a timer circuit in the computer 19, but the LED 11 may be turned OFF (or switched to a different colour) by appropriate signals transmitted from the parking service provider at the termination of the approved parking period. The turning OFF of the LED 11 (or change in colour) conveniently indicates that the device is no longer in a "positive condition".

In some situations it may be necessary to visibly indicate that the device is being used in the actual parking bay or zone for which the approval has been obtained from the parking service provider. In that case, the screen 14 may be controlled to display a specific bay or zone (e.g. SF A 47). This is to indicate to the patrolling parking attendant in this case that the parking approval has been given for "San Francisco"—"Zone A"—and that "47" minutes remain of the parking period approved. The minutes can be counted down, as time passes, and the LED 11 will remain ON for the remaining period. (Of course, the LED 11 may be omitted in this case and the minute numeral in effect used to indicate the so-called "positive condition" instead of using the LED or similar if preferred.)

The device may also be programmed to send a signal to the user via the radio network channels to his mobile or land telephone to alert the user that the approved parking period is drawing to a close. This enables the user to return to the vehicle or, in some cases, to apply for an extension of the approved parking time.

As foreshadowed above, the described device can be programmed to respond to a vehicle security alarm system and arranged to provide audible or visible alarms if a vehicle door is opened or the vehicle tampered with in such a manner that the vehicle alarm system is triggered. More helpfully, the device can be programmed to generate signals that are transmitted to the parking service provider, or to the user via a connection to his normal telephone, via the radio network channel, to indicate that an unauthorised entry has been made. The described device may also be equipped and coupled to communicate to a GPS facility so that navigation aid maps can be displayed on the screen 14. The maps can also be updated by the parking service provider to display nearby vacant parking bays to assist the vehicle user to more quickly find such bays and so reduce unnecessary travelling delays and general traffic congestion. The GPS facility can also be used to track a vehicle that has been lost or stolen based on signals transmitted from the described parking meter device in such circumstances.

I claim:

1. A parking meter device for separate devoted use by a vehicle user arranged to be located in the vehicle during use and visible from outside the vehicle, the device comprising a portable housing unit arranged to be supported inside the vehicle and including a visual indicator for portraying a positive condition of the device during use, a two-way radio circuit for communicating with a parking service provider, a screen and manually responsive switch means, including a computer programmed to enable the user by using the switch means to alert the service provider of his desire to park in a parking bay and for the service provider to check payment arrangements of the user and approve vehicle parking for a time period, in which the approval is confirmed during that time period by maintaining the device in the positive condition.

2. A parking meter according to claim 1, in which the manually responsive switch means is a keypad.

3. A parking meter according to claim 1, in which the unit is releasably attachable in the vehicle.

4. A parking meter according to claim 1, in which the unit includes a timer arranged to change the device from the positive condition after a predetermined time interval.

5. A parking meter according to claim 4, in which the visual indicator is arranged to portray another condition of the unit after the termination of the predetermined time interval.

6. A parking meter according to claim 1, in which the unit is arranged to incorporate a Subscriber Identity Module (SIM card).

7. A parking meter according to claim 1, in which the unit has a port arranged to receive and hold a pre-paid tariff parking card.

8. A parking meter according to claim 1, in which the device is arranged to respond to signals from a vehicle security alarm system and to transmit a warning signal when initiated by the vehicle security alarm system.

9. A parking meter according to claim 8, in which the warning signal is a radio signal.

10. A parking meter according to claim 9, in which the radio signal is transmitted to a telephone network.

11. A parking meter according to claim 1, in which the device is arranged to communicate with a Global Positioning System (GPS).

12. A parking meter according to claim 11, in which the device is arranged to receive information from the parking service provider identifying on the screen any unoccupied parking bays in locations adjacent to the vehicle.

* * * * *